United States Patent
Schmale et al.

(10) Patent No.: US 6,467,601 B2
(45) Date of Patent: Oct. 22, 2002

(54) BRAKE ROLLER FOR A ROLLER CONVEYOR

(76) Inventors: Erhard Schmale, Kiefernweg 11, Breuna-Wettesingen (DE), 34479; Kurt Schön, Caldenbergerstrasse 15, Breuna-Wettesingen (DE), 34479

( * ) Notice: Subject to any disclaimer, the term of this patent is extended or adjusted under 35 U.S.C. 154(b) by 0 days.

(21) Appl. No.: 10/101,261

(22) Filed: Mar. 19, 2002

(65) Prior Publication Data

US 2002/0134643 A1 Sep. 26, 2002

(30) Foreign Application Priority Data

Mar. 21, 2001 (DE) .......................................... 101 13 631

(51) Int. Cl.[7] ................................................ B65G 13/00
(52) U.S. Cl. .................................................... 193/35 A
(58) Field of Search ................... 193/35 A, 37

(56) References Cited

U.S. PATENT DOCUMENTS 3,352,397 A * 11/1967 Becker et al. ............ 193/35 A
3,713,521 A * 1/1973 Moritake .............. 193/35 A X

FOREIGN PATENT DOCUMENTS

RU 1696030 * 12/1991 ................ 193/38 A
SE 199648 * 11/1965 ................ 193/35 A

* cited by examiner

Primary Examiner—James R. Bidwell
(74) Attorney, Agent, or Firm—James P. Hanrath

(57) ABSTRACT

The subject matter of the present invention is a brake roller (30, 40, 50, 60) for a roller conveyor (1) with a cylindrical tube (32, 42, 52, 62), said tube being rotatably carried on an axle (31, 41, 51, 61) that is resting on supports (2), said cylindrical tube being provided with a braking device, said braking device being provided with means for producing electromagnetic fields for slowing down the cylindrical tube (32, 42, 52, 62).

11 Claims, 5 Drawing Sheets

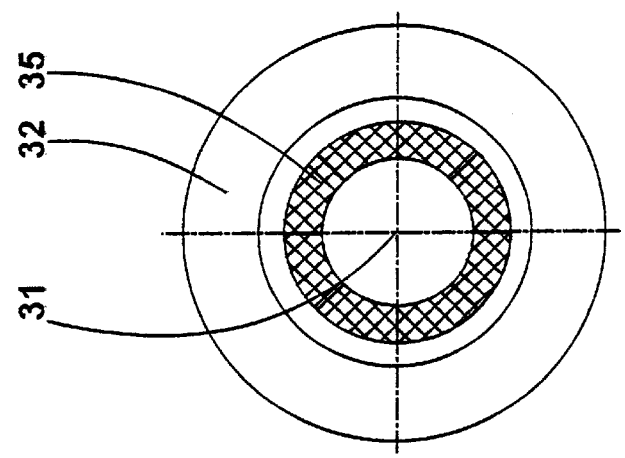
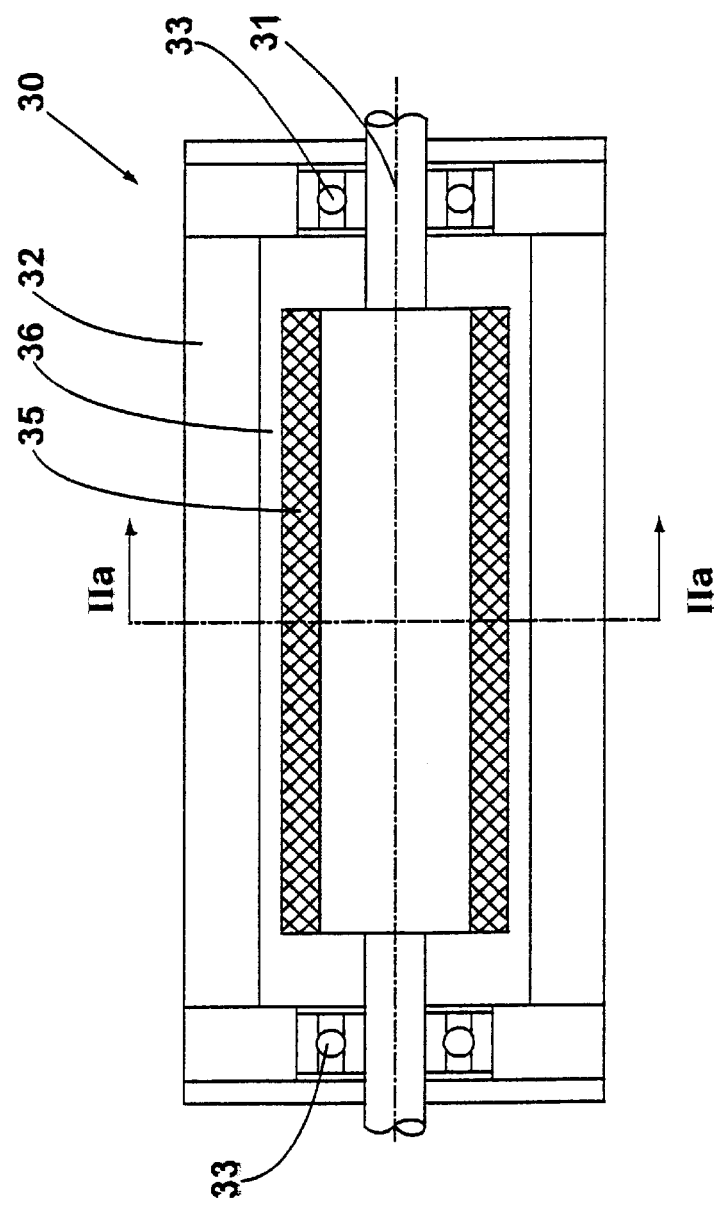
Fig. 2a
Fig. 2

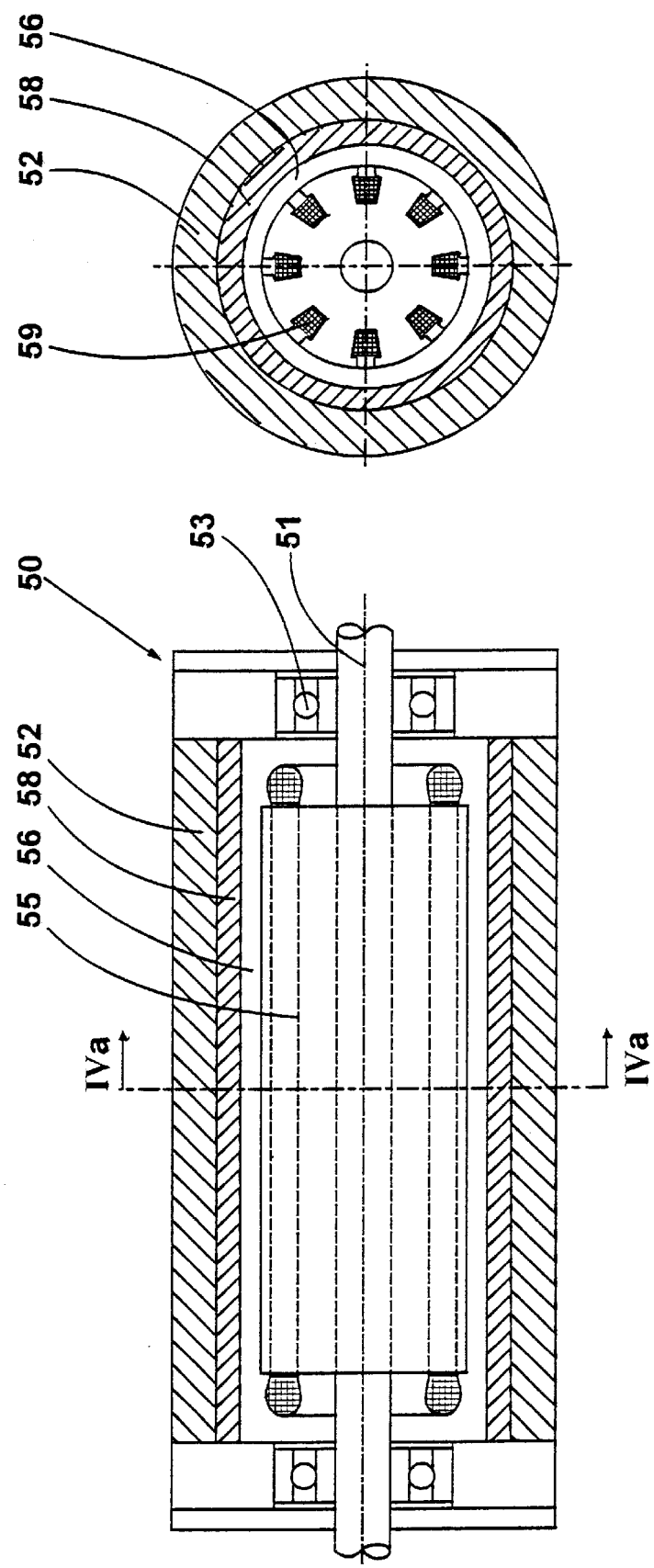

BRAKE ROLLER FOR A ROLLER CONVEYOR

BACKGROUND OF THE INVENTION

1. Field of the Invention

The invention relates to a brake roller for a roller conveyor with a cylindrical tube, said tube being rotatably carried on an axle that is resting on supports, said cylindrical tube being provided with a braking device.

A roller conveyor is characterized by several parallel rollers which are set in the support and serve to convey the most varied goods. Such type roller conveyors are component parts of what are termed flow shelving systems for commissioning certain package goods in the form of boxes or pallets for example. Such a flow shelf has two ends, namely one load side and one unload side. A pallet or a box placed for example on the load side of the roller conveyor is moved by gravity toward the unload side. On the unload side, individual goods or the pallet as a whole may then be unloaded. These roller conveyors are inclined at a certain angle so that the goods may glide along the roller conveyor under the force of gravity. The incline usually is 2.degree. To prevent the pallets or the boxes from arriving at too great a speed at the unload side of the roller conveyor of the flow shelf, the roller conveyors are provided with so-called brake rollers for slowing down the goods in an effort to ensure that the goods in the box or on the pallet are not damaged when they bump against the stop on the unload side of the roller conveyor. These known brake rollers have a certain given braking torque. The magnitude of the braking torque is adapted to the angle of inclination of the roller conveyor and to the weight of the goods gliding thereon. This is to say that when the load is lighter, the braking torque may be smaller whereas a high braking torque is needed when the goods are heavy.

2. Description of the Prior Art

A known brake roller more specifically consists of a cylindrical steel tube that carries a braking device within its confines. Such a braking device is built like a planet gear for example. However, such a planet gear is very prone to dirt and grime and is in addition quite easily damaged if it is being used improperly. A reason for improper utilization may be that the objects transported on the roller conveyor reach too soon the region of the brake rollers, the acceleration of the tube of the brake roller being so high as a result thereof that the planet gear, which is arranged in the tube, is destroyed on account of its inertial mass.

Brake rollers with a braking device operating in the way of a centrifugal brake are furthermore known. Such braking devices are also subject to dirt and wear.

Another drawback of such brake rollers is that, due to their construction, both the planet gear and the centrifugal brake have a relatively high initial breakaway torque. This is to say that more particularly with light loads the risk arises that the initial breakaway torque is not overcome and that the load, the pallet or the box for example, does not reach the unload side.

BRIEF SUMMARY OF THE INVENTION

It is therefore the object of the present invention to provide a brake roller of a roller rail for a roller conveyor of a flow shelving system that may be manufactured at low cost on the one hand and is robust and provided with a long usable life on the other hand.

To achieve this object and in accordance with the purpose of the invention, the braking device, which is accommodated in the tube of the brake roller, is provided with means for producing electromagnetic fields for slowing down the cylindrical tube. The braking device is built like a generator or an electric motor or like an eddy current brake respectively for the purpose of producing electromagnetic fields.

The advantage of such a brake is that it has no initial breakaway torque. What is even more important is that the braking torque increases continuously as the speed increases. That is to say that goods that are moved past the brake roller at too great a speed are slowed down to a greater extent than slower goods. It is thus made certain that the goods never reach the unload side at great speed. Furthermore, such rollers are substantially wear-free. More particularly if the braking device is designed as an eddy current brake, there is provided that several permanent magnets with changing polarity are arranged on the circumference of the axle, the cylindrical tube being made from an electrically conductive material e.g., steel. In arranging permanent magnets, heat generating eddy currents are induced into the steel cylinder, energy being consumed in the process, which in turn produces the desired braking effect.

According to a particular feature of this embodiment, the cylindrical tube is provided on its inner surface with an insert body made from a material having the properties of high electric conductivity like copper of aluminum for example. In arranging a tube made from aluminum or copper directly opposite the magnets, a higher braking effect is obtained on account of the higher electric conductivity. Accordingly, it has to be noted that the brake roller is designed in a way similar to that of a generator or of a motor and that there has to be an air gap between the magnets and the cylindrical tube or the insert body respectively.

According to another embodiment, there is provided that the braking device is provided with a cage with several windings arranged on the axle, the cylindrical tube being again made from electrically conductive material. Permanent magnets are substituted for the live windings, a change in voltage also permitting to accordingly influence the brake force as higher eddy currents are induced when the voltage is higher. According to a particular feature of this embodiment, the tube is again provided on its inner surface with an insert body made from a material having the properties of high electric conductivity like copper or aluminum for example. The number of poles of the windings amounts to at least 2, a higher number of poles permitting to achieve smooth operation and accordingly higher braking effect. In principle, such a brake roller has the same structure as an asynchronous motor.

According to another variant of this last embodiment, laminations or an iron core respectively are provided about the axle between the discrete windings, the tube being provided on its inner surface with permanent magnets with changing polarity. The number of poles of the windings again amounts to at least 2. With regard to the braking device, the design of the brake roller hereby resembles that of a servomotor or of a synchronous motor controlled with permanent magnets.

The two last mentioned embodiments have the advantage that the braking effect may be varied by controlling the voltage. That is to say that the brake force may be adjusted in function of the weight of e.g., a pallet on the roller conveyor or in function of the nature of the good provided with a soft or a harder bottom.

BRIEF DESCRIPTION OF THE SEVERAL VIEWS OF THE DRAWING

The invention is explained in more detail with reference to the drawing.

FIG. 2 and shows a brake roller with an axle with several permanent magnets;

FIG. 2a is a sectional view taken along line IIa—IIa of FIG. 2;

FIG. 4 shows a brake roller according to FIG. 3, electronic windings being arranged on the axle;

FIG. 4a is a sectional view taken along line IVa—IVa of FIG. 4;

DETAILED DESCRIPTION OF THE INVENTION

Figure 1:
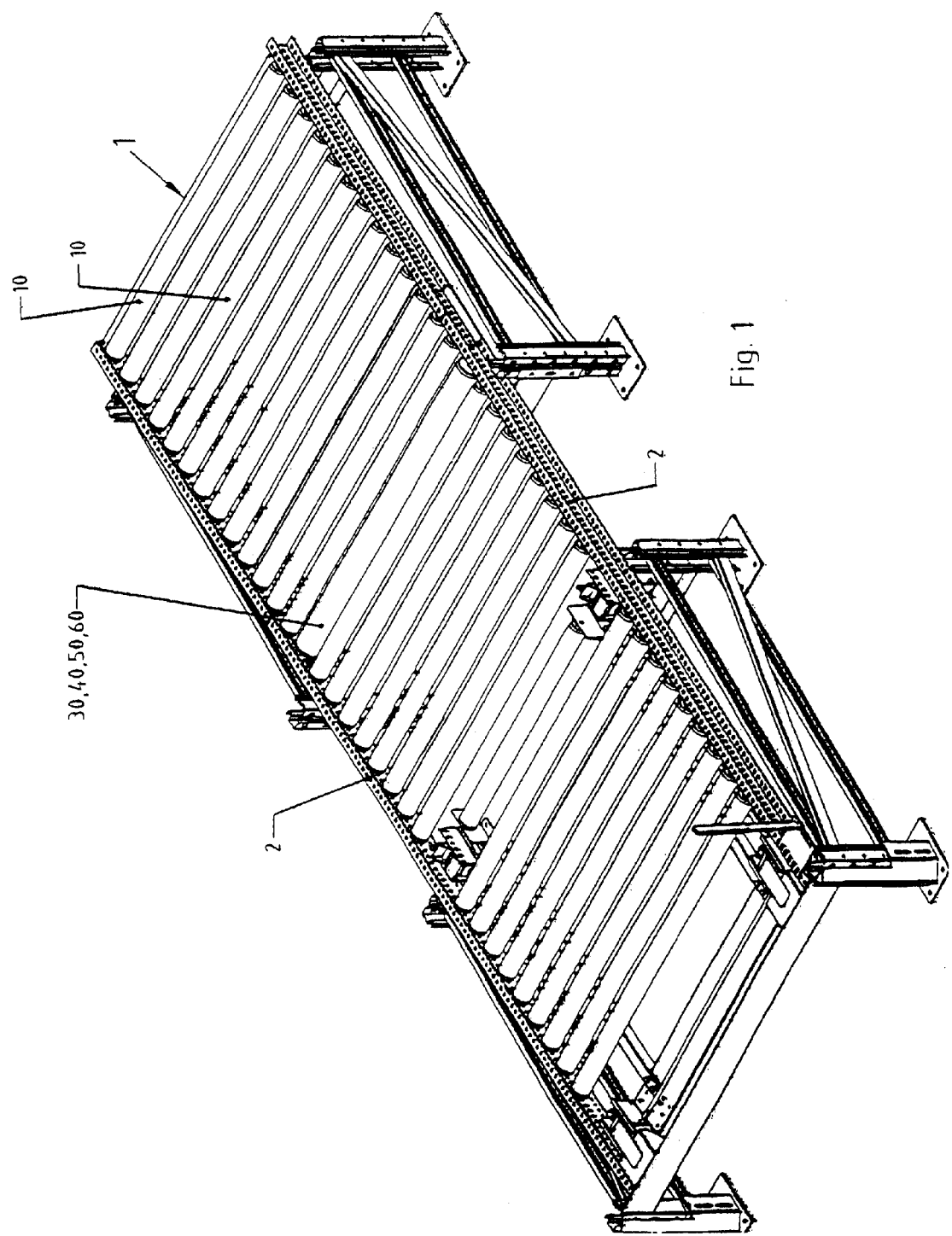
FIG. 1 schematically illustrates a roller conveyor with brake rollers.

FIG. 1 schematically illustrates a roller conveyor 1 with two parallel supports 2 serving for receiving the rollers. The rollers held by the supports 2 are composed of idler rollers 10 and brake rollers 30, 40, 50, 60. The brake rollers 30, 40, 50, 60 have axles 31, 41, 51, 61 that are non-rotatably linked to the supports 2. The brake rollers 30, 40, 50, 60 differ from one another as will become apparent from the explanations given herein below.

In the embodiment of a brake roller 30 with the axle 31 as it is illustrated in FIG. 2a, there is provided a cylindrical tube 32 made from steel which is rotatably carried on the axle 31 via bearings 33. The axle 31 furthermore has several permanent magnets 35 with 8 poles. There is an air gap 36 between the permanent magnets 35 and the metallic cylinder 32. In rotating the cylinder 32 relative to the permanent magnets, eddy currents are induced into the steel cylinder, said eddy currents eventually producing the braking effect. The magnitude of the braking effect depends of course on the surface of the permanent magnets which means that the brake force may be increased or reduced by increasing or reducing the surface of the magnets.

Figures 3, 3A:
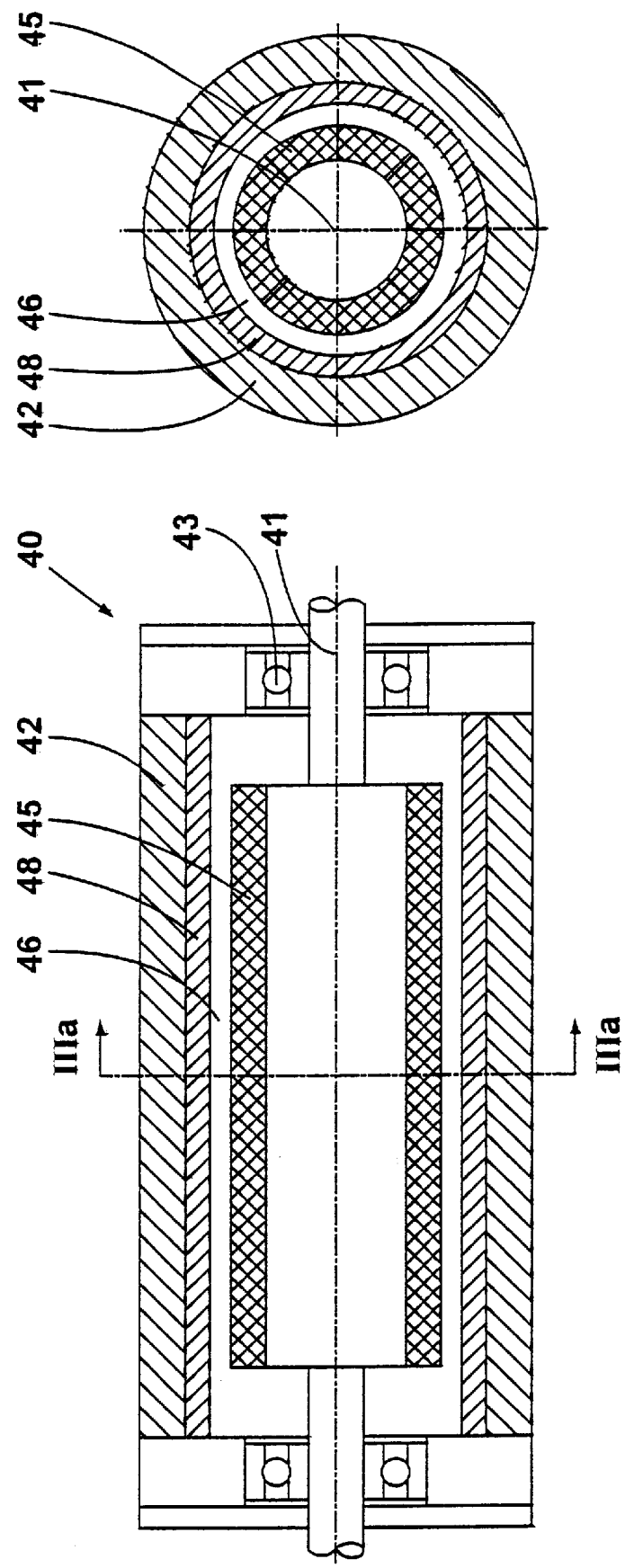
FIG. 3 shows a brake roller according to FIG. 2 in which the cylindrical tube is provided with an insert body made from an electronically conductive material.
FIG. 3a is a sectional view taken along the line IIIa—IIIa of FIG. 3.

The embodiment according to FIG. 3 or FIG. 3a respectively only differs from that in FIG. 1 in that there is provided, on the inner surface of the cylinder 42, a cylindrical insert body 48 made from a material having the features of particular high electric conductivity such as aluminum or copper for example. In connection with the permanent magnets 45 which have 8 poles and are carried on the axle 41, said axle in turn communicating with the cylinder 42 by way of the bearings 43, the braking effect is enhanced on account of the improved conductivity of the cylindrical insert body 48. That is to say that the braking effect may also be influenced by the material chosen for the insert body 48. The air gap is labeled with the numeral 46.

In the embodiment according to FIGS. 4 and 4a, the brake roller 50 is characterized by a cylinder 52 that is again rotatably supported on the axle 51 via the bearing 53. The cylinder 52 is provided on its inner surface with an insert body 58 made from a material having the features of particular high electric conductivity such as aluminum or copper for example. Eight windings 59 are spaced around the circumference of the axle 51 and constitute, together with the axle 51, the rotor 55. The windings 59, which may be embedded in laminations or in an iron core, furthermore communicate with a voltage supply unit, so that the braking effect may be controlled by changing the voltage. This realization of the brake roller resembles the construction of an asynchronous motor and has, as a result thereof, an air gap 56 between the rotor 55 and the insert body 58.

Figures 5, 5A:
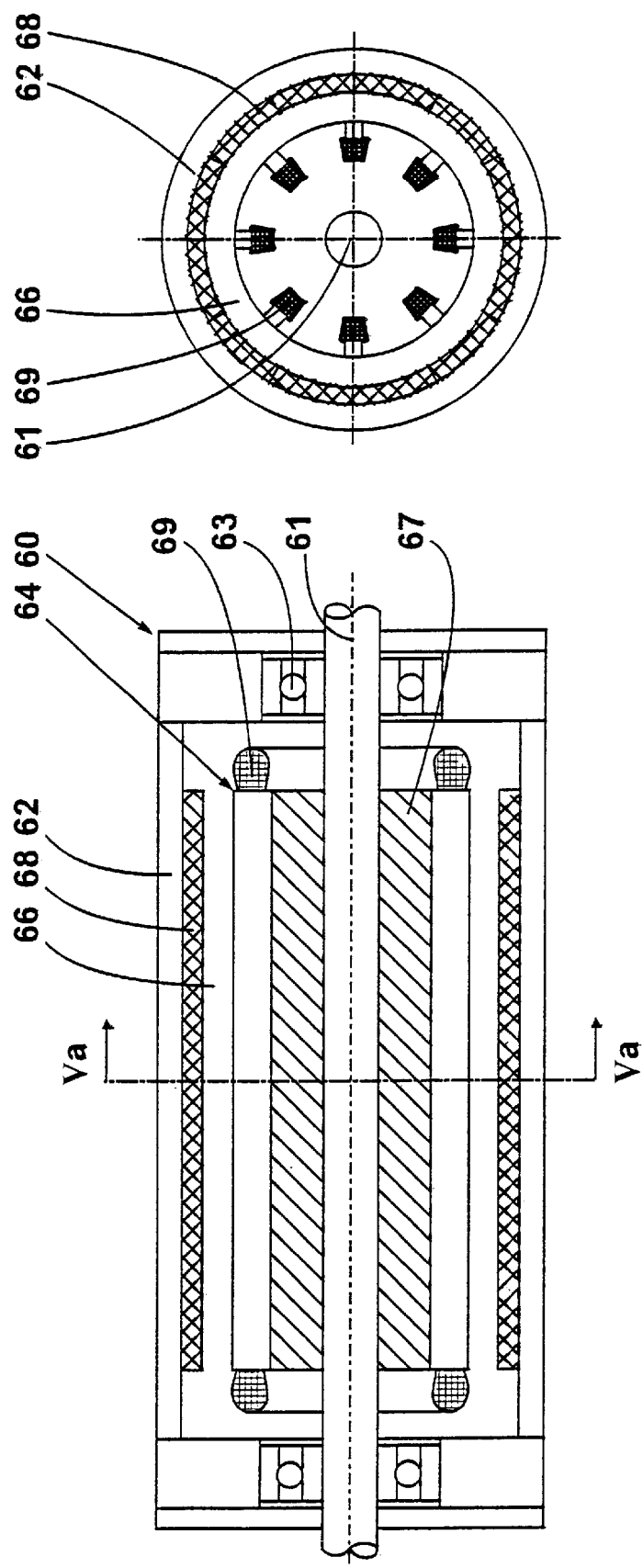
FIG. 5 shows a brake roller according to FIG. 4, permanent magnets being arranged on the inner surface of the cylindrical tube.
FIG. 5a is a sectional view taken along the line Va—Va of FIG. 5.

The embodiment according to FIG. 5 and FIG. 5a differs from that of FIG. 4 and FIG. 4a in that here, on the inner surface of the cylindrical tube 62, permanent magnets 68 are provided on the brake roller 60, said permanent magnets being spaced from the supported rotor 64 with the axle 61 by an air gap 66. The rotor 64 has laminations 67 with several windings 69. The windings 69 are outward windings and are connected to corresponding resistors so that the braking effect may be influenced by the magnitude of the resistance. The design of this brake roller resembles a servomotor or a synchronous motor controlled with permanent magnets.

We claim:

1. A brake roller (30, 40, 50, 60) for a roller conveyor (1) with a cylindrical tube (32, 42, 52, 62), said tube being rotatably carried on an axle (31, 41, 51, 61) that is resting on supports (2), said cylindrical tube being provided with a braking device having means for producing electromagnetic fields for slowing down the cylindrical tube (32, 42, 52, 62), characterized in that several permanent magnets (35, 45) with changing polarity are arranged on the circumference of the axle (31, 41), the cylindrical tube (32, 42) being made from an electrically conductive material.

2. The brake roller according to claim 1, characterized in that the cylindrical tube (42) is provided on its inner surface with an insert body (48) made from a material having high electric conductivity.

3. The brake roller according to claim 2, characterized in that there is provided an air gap (36, 46) between the magnets (35, 45) and the cylindrical tube (32, 42) or the insert body (48) respectively.

4. The brake roller according to claim 1, characterized in that the braking device is provided with several windings (59, 69) arranged on the axle (51, 61).

5. The brake roller according to claim 4, characterized in that the cylindrical tube (52, 62) is made from a material having high electric conductivity.

6. The brake roller according to claim 4, characterized in that the number of poles of the windings (59, 69) amounts to at least 2.

7. The brake roller according to claim 4, characterized in that the cylindrical tube (52) is provided with an insert body (58) made from a material having high electric conductivity.

8. The brake roller according to claim 4, characterized in that the axle (61) is provided with laminations (67) in the region of the windings (69).

9. The brake roller according to claim 8, characterized in that the tube (62) is provided on its inner surface with permanent magnets (68) with changing polarity.

10. The brake roller according to claim 8, characterized in that the number of poles of the winding (69) amounts to at least 2.

11. The brake roller according to claim 1, characterized in that the braking device is designed as an eddy current brake.

* * * * *